Feb. 2, 1954 A. L. VINTENON 2,668,269
REVERSIBLE DIRECT CURRENT GENERATOR
Filed May 22, 1951 3 Sheets-Sheet 2
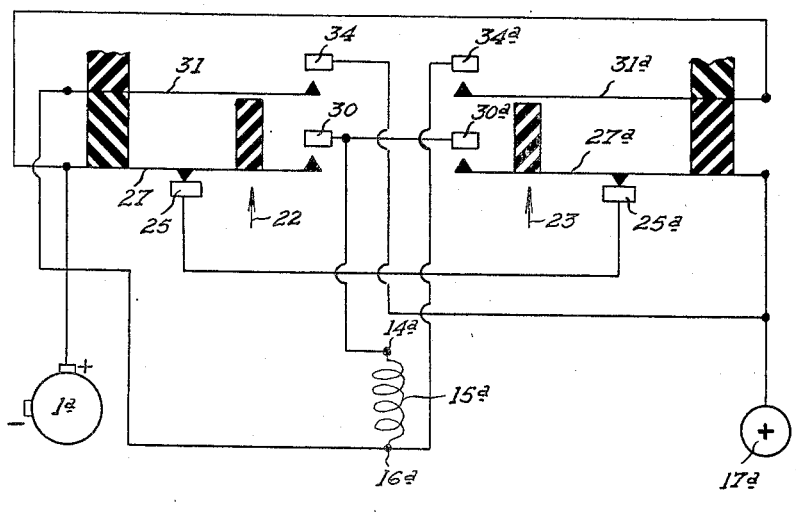
Fig. 3
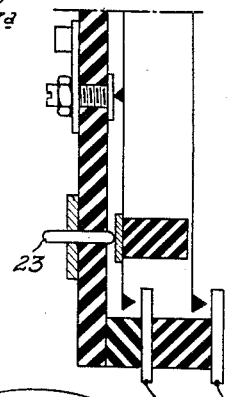
Fig. 2
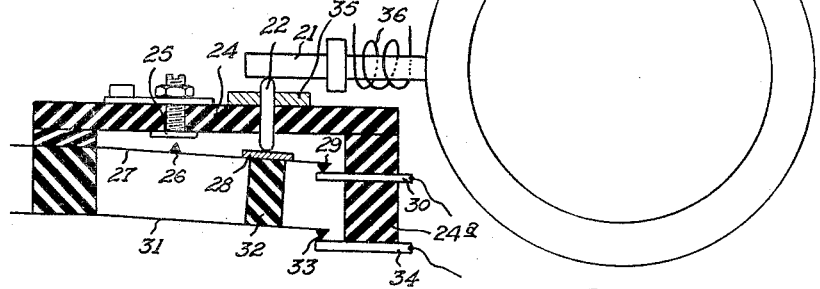
INVENTOR
ANDRE LOUIS VINTENON
By: Hauetine, Lake & Co.
AGENTS

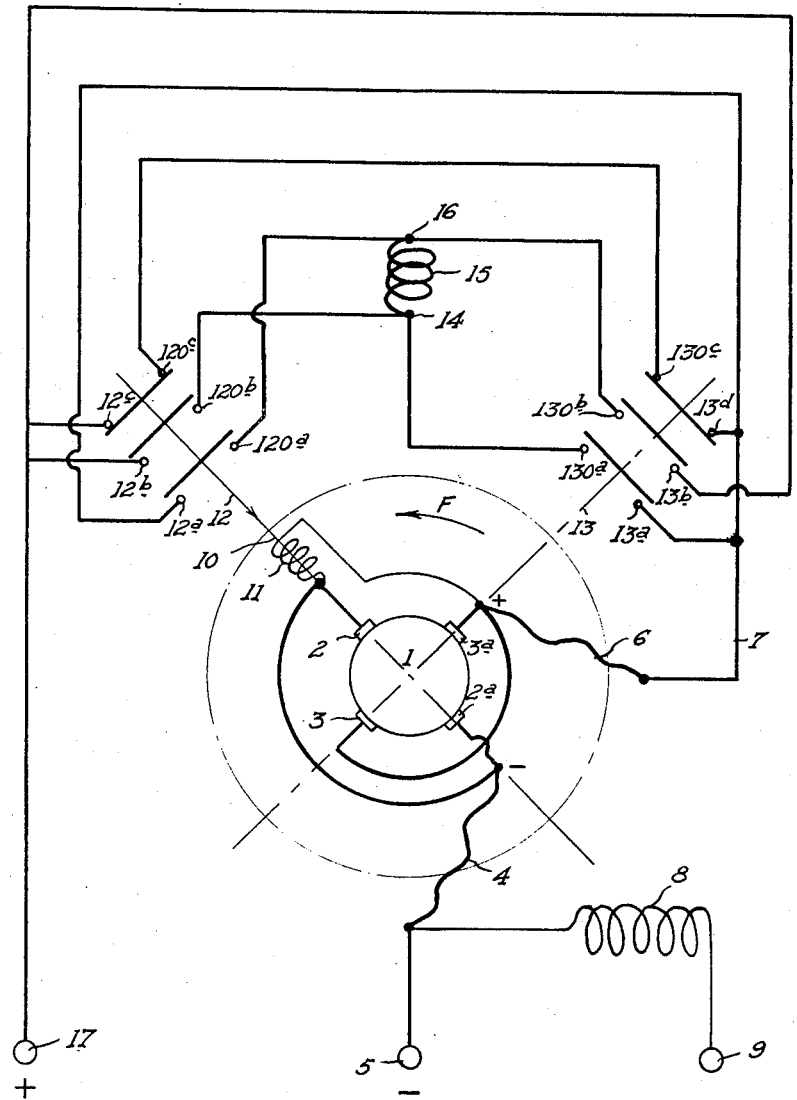

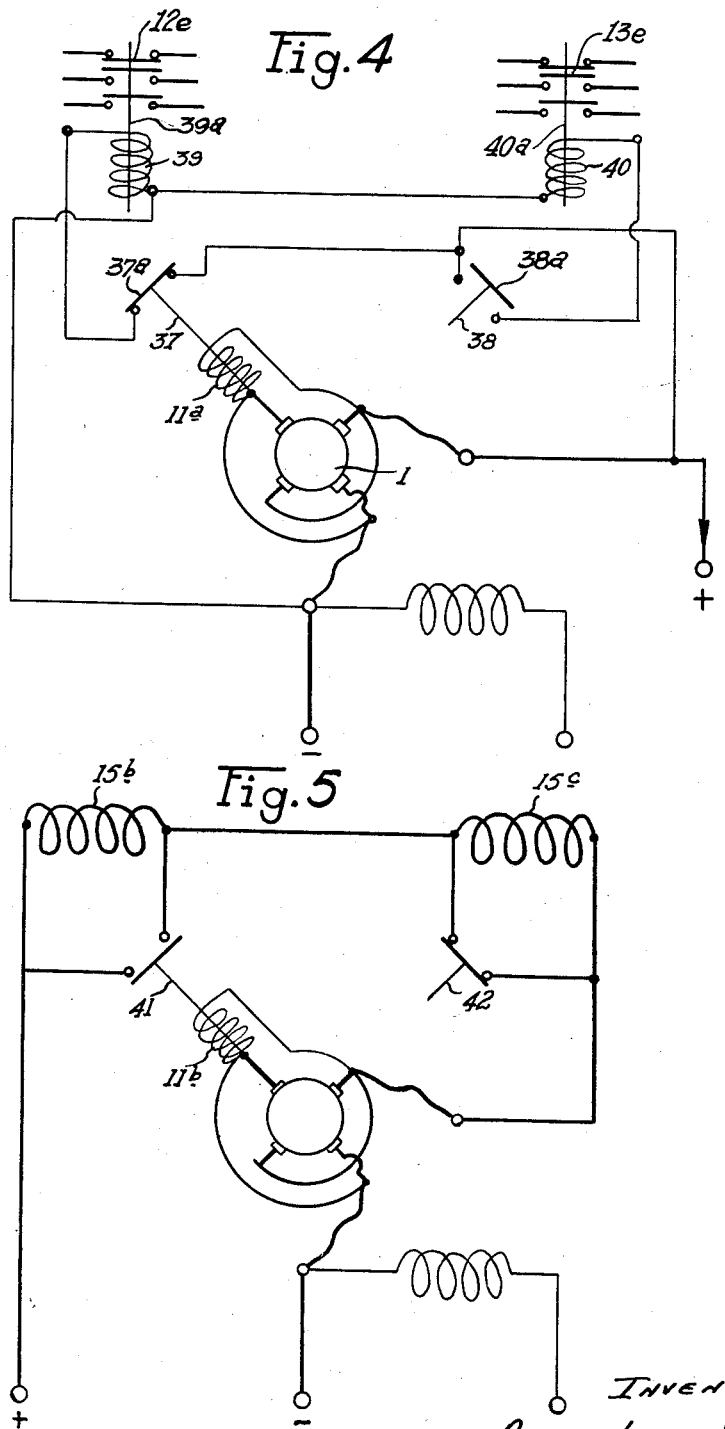

Patented Feb. 2, 1954

2,668,269

UNITED STATES PATENT OFFICE 2,668,269

REVERSIBLE DIRECT CURRENT GENERATOR

André Louis Vintenon, Bois-Colombes, France, assignor to Electrom, Neuilly-sur-Seine, France, a company Application May 22, 1951, Serial No. 227,575

Claims priority, application France May 26, 1950

11 Claims. (Cl. 322—17)

Dynamo machines that are driven by a shaft adapted to revolve in both directions, said shaft being e. g. incorporated in the axle of a vehicle, are generally provided with brush holders rigid with a ring that is in its turn carried by an antifrictional bearing or a ball bearing in a manner such that the friction of the brushes over the commutators may drive the brushes automatically in the desired direction into either of two positions that are defined by two stops limiting the rotation of the ring to one polar switch. The connections with said brushes are provided through small flexible cables.

In the case of dynamo machines to be used on railroad vehicles, there is often associated with the stops limiting the rotary movement of the brush-carrying ring a magnetic locking device constituted by a winding connected across the terminals of the dynamo machine and providing for the energetic contact through adherence between a stopping finger on the brush-carrying ring and the stop. This magnetic locking has for its advantage to prevent any oscillation or vibration of the ring when the dynamo machine is feeding current.

These reversing means are standard and provide complete satisfaction but they show the serious drawback of not allowing the execution of dynamo machines of this type when they are to be provided with commutating poles.

As soon as dynamo machines of this type assume a high rate of rotation or as soon as their power exceeds a few kilowatts, the absence of such commutating poles restricts narrowly the conditions governing their calculation and leads to a costly execution as it is generally necessary to provide armature sections with a small number of turns which leads in its turn to the necessity of providing highly subdivided commutators.

In the execution of such a dynamo machine which develops a power higher than about say fifteen kilowatts, one is led to resort to a system of stationary brushes and, in order to allow reversal of movement, the suitable connection of the field pieces is obtained through outer switches, whereby it is easy to meet the difficulties that may arise. In contradistinction, as such a dynamo machine cannot start without external aid, owing to the fact that the coils controlling the switches are energized by the current from the machine, said switches lie open when the latter is at a standstill, it is necessary to incorporate in the machine a machine provided with permanent magnets or again an exciter adapted to control in the desired direction the reversing switches.

Such a construction is also satisfactory but its application is practically impossible in the case of small powers either for constructional reasons or because of the high cost price to be considered. As a matter of fact, the system of outer switches is intricate and expensive and a small dynamo machine of such a type would be more expensive than a simplified dynamo machine the size of which is larger by reason of the absence of commutating poles.

My invention has for its object to remove such drawbacks and it allows incorporating commutating poles in a machine of the above defined type provided with a movable ring with brush holders.

According to my invention, the stop for the movable ring may include a pusher member providing for the operation of a switch when the stopping finger rigid with the ring engages said stop. Said switch is adapted to reverse the direction of flow of the current through the commutating poles and said reversal is obtained in the direction corresponding to the stop actually engaged by the stopping finger.

The operation of the switches may be provided directly and mechanically by means of the arrangement just described, or else, electrically through a magnetic or electromagnetic armature that moves with the brush-carrying ring, said armature registering with and controlling either of two movable switches according to the direction of rotation of the machine. The armature considered may, furthermore, for reason of bulk in particular, act on a simple relay remotely controlling switches of a more complex character.

When the reversal of speed is obtained through mechanically controlled contact-pieces, it is of advantage to retain on the stops the usual magnetic locking means that allow obtaining very simply the closing of the reversing switches through a mere mechanical engagement of the stopping finger of the ring with a view to energizing suitable windings on the commutating poles when the thrust on the stop increases by reason of the starting of the machine, as said increase in thrust is due to electro-magnetic attraction.

I will now describe with reference to accompanying drawings that are given by way of a mere exemplification and by no means in a binding sense, a preferred embodiment of my invention. In said drawings:

Fig. 1 is a wiring diagram of the electric connections and reversing switches for the commutating poles, according to the invention;

Fig. 2 illustrates diagrammatically the execution of a stop for mechanical reversal of the commutating pole circuits;

Fig. 3 is a wiring diagram of the connections of said mechanically operating reversing stop;

Fig. 4 is a first modification of the wiring diagram of Fig. 1 and

Fig. 5 is a further modified and simplified wiring diagram.

As apparent from inspection of Fig. 1, the dynamo machine includes an armature 1 the commutator of which is engaged by four brushes, 2, 2a and 3, 3a. The brushes 2 and 2a are connected by a short flexible cable 4 with the negative terminal 5 while the brushes 3 and 3a are similarly connected through a small flexible cable 6 with a lead 7. The dynamo machine includes also a field winding 8 inserted in shunt relationship with the armature, connected permanently with the negative terminal 5 and adapted to be fed through its opposite end by a terminal 9 connected with any energizing means such as an exciter, that is not illustrated.

The brushes 2, 2a, 3, 3a are carried by brush holders mounted on a ring adapted to revolve round the axis of rotation of the armature. This ring is provided with an exciting armature 10 surrounded by a winding 11 inserted in parallel between the brush 2 and the brush 3a.

The abutments for the brush-carrying ring that are not illustrated, provide for the stopping of the armature 10 either in register with the movable member or pole piece 12 of a first three circuit switch or in register with the similar member 13 of a second three circuit switch. When the armature 10 comes into register with such a member while the machine is feeding current, said member is attracted.

The wire 7 connected with the brushes 3 and 3a leads to the contact pieces 13a and 13d corresponding to the first and third contact blades of the switch 13 and also with the contact piece 12a of the switch 12 corresponding to the first contact blade of the last mentioned switch. The contact piece 130a adapted to cooperate with the contact piece 13a is connected with the terminal 14 of the commutating poles 15 and said terminal 14 is also connected with the contact piece 120b cooperating with the second contact blade of the switch 12. The terminal 16 of the commutating poles 15 opposed to the terminal 14 is connected with the contact piece 120a of the first contact blade of the switch 12 and with the contact piece 130b of the second contact blade of the switch 13. The contact piece 13b corresponding to said contact piece 130b is connected with the positive terminal 17 or output terminal of the dynamo machine together with the contact pieces 12b and 12c associated with the second and third contact blades of the switch 12. The contact pieces 120c and 130c are interconnected through a short circuiting of bridging wire.

The operation of the switch arrangement described is as follows, taking into account the fact that the switches are designed in a manner such that the first and second contact blades reach their operative position before the third contact blade has moved out of its rest position for which it closes the armature circuit over the bridging wire:

When the switches are at rest, the contact pieces 13d and 130c are interconnected and so are the contact pieces 12c and 120c. The commutating poles are de-energized as the contact pieces 13a—130a, 13b—130b, 12a—120a and 12b—120b are not connected. The armature 1 is connected through the wire 6, the wire 7, the contact pieces 13d and 130c and the contact pieces 120c and 12c associated through the bridging wire with the latter, with the terminal 17. The armature 1 may thus feed current into the outer circuit and the dynamo machine starts. If the machine revolves in the direction of the arrow F, the armature 10 revolves in the direction of said arrow and it is stopped by the stop registering with the switch 12, the movable member of which is then attracted as the winding 11 is energized through the operating machine. The first and second blades of the switch 12 reach their operative position and close the circuit elements passing through them while the third blade reaches its operative position corresponding to a de-energization of the bridging wire. The commutating poles 15 are fed in the direction leading from the terminal 16 to the terminal 14 through the following circuit: wire 6, wire 7, closed contact pieces 12a—120a, terminal 16, winding 15, terminal 14, closed contact pieces 12b—120b and terminal 17.

If the machine revolves in the direction opposed to that of the arrow F, the winding 11 registers with the switch 13. The commutating poles 15 are now fed with current in the direction 14, 16 through the circuit: wire 6, wire 7, closed contact pieces 13a, 130a, terminal 14, winding 15, terminal 16, closed contact pieces 130b—13b and terminal 17.

It is apparent that the direction of flow of the current through the winding 15 is properly reversed, each time the direction of rotation of the machine changes, said reversal corresponding also to a change in position of the brushes.

This electro-magnetic control of the reversing means may be simplified, as illustrated in Fig. 2, relating to a mechanically controlled system of switches. The brush-carrying ring 20 is provided with a stopping finger 21 adapted to rock between a stop 22 and a stop 23. Said stops are constituted by pusher members adapted to act on movable blades, said pusher members passing through insulating plates 24 carried by the stationary frame of the dynamo machine. The two stops are identical. Each plate 24 carries a stationary contact piece 25 adapted to be engaged by a contact piece 26 carried by a yielding blade 27. The latter also carries an insulating plate 28 submitted to the thrust of the pusher member 22 and a second contact piece 29 adapted to engage a stationary contact piece 30 fitted in an insulating plate 24a carried by insulating plate 24. A blade 31 parallel with the blade 27 is controlled by a stay 32 in a manner such that the contact piece 33 thereon may engage a stationary contact piece 34 similar to the contact piece 30, the contact pieces 29 and 33 being adapted to close simultaneously under the action of the movement of the stay 32. The length and the flexibility of the blades 27 and 31 are defined in a manner such that when the pusher member 22 is depressed, the contact pieces 29 and 33 engage the stationary contact pieces 30 and 34 before the contact piece 26 moves away from the plate 25. The point of application of the pusher member 22 on the blade 27 is located between the contact piece 29 and the contact piece 26 which latter opens only when the contact piece 29 has actually engaged the contact piece 30 and has constrained the blade 27 to assume a flexional movement round the bearing point thus constituted by the contact piece 29.

The driving of the ring 20 through the frictional action of the brushes on the commutator brings the stopping finger 21 into contact with the pusher member 22 and in order to provide for the operative engagement of the contact pieces through an energetic pressure that is proof against vibrations or oscillations, the projecting finger 21 forms a pole piece energized by a magnetic winding 36 fed by the current from the machine. When the winding 36 is energized, the pole piece 21 attracts an armature 35 carried by the insulating plate 24 and surrounding the pusher member 22, said armature 35 being connected with the frame of the machine, whereby the attracting magnetic circuit may be closed through said frame and the ring 20.

This attraction reinforces the thrust exerted on the pusher member 22. The pole piece 21 is arranged symmetrically in order to engage indifferently either of the stops that are designed in a similar manner.

The wiring diagram of such an arrangement is illustrated in Fig. 3 in a manner quite similar to that illustrated in Fig. 1. The armature 1a is connected through its negative brushes with ground e. g. while the positive brushes are connected with the blades 21 and 31a that are submitted to the action of the corresponding pusher members 22 and 23. The plates 25 and 25a are connected through a bridging or short-circuiting wire. The blade 31 is connected with the terminal 16a of the commutating poles 15a while the terminal 14a of the commutating poles is connected with the stationary contact-pieces 30 and 30a of the two switches. The terminal 16a is also connected with the stationary piece 34a. The corresponding stationary contact piece 34 on the other switch is connected with the positive terminal 17a that is also connected with the blade 27a.

The operation of this reversing device is quite similar, from an electrical standpoint, to that described with reference to Fig. 1 and does not require any further description.

As apparent from inspection of Fig. 4 illustrating diagrammatically an indirect control device, the relay winding 11a similar to the winding 11 acts on the armatures 37 and 38, each having a single contact blade 37a or 38a. These contact blades close the circuits controlling the electromagnets 39 or 40 respectively, the movable armatures 39a and 40a of which control switches 12e and 13e similar to the switches 12 and 13 illustrated in Fig. 1, the connection with the commutating poles remaining the same as precedingly. The windings 39 and 40 are connected respectively with the positive and negative poles through the contact pieces of the relay armatures 37 and 38 that are actuated selectively.

In Fig. 5, I have illustrated diagrammatically a modification adapted to provide operation through switches including a single movable part. To this end, the commutating poles are provided with a double winding 15b—15c the elements of which are connected in order to produce magnetic actions of opposite directions when energized.

The winding 15b or the winding 15c is short-circuited only when it is not in use and for this purpose, the energizing winding 15b carried by the brush-carrying ring, acts on either of the movable armatures 41 and 42 in order to short-circuit contact-pieces connected with the opposite terminals of the windings 15b or 15c, as the case may be, while the other non-attracted armature opens the short-circuiting connection between the corresponding contact-pieces. In Fig. 5, the movable armature 41 is illustrated in its operative position, while the armature 42 is shown in its rest position. The winding 15c is thus short-circuited and the winding 15b of the commutating pole is operative. This simplified wiring diagram allows the correct starting of the dynamo machine and the magnetic energization of the commutating poles in the direction required by the direction of rotation and by the location of the brushes. Although this arrangement leads to a double winding for each commutating pole this is not inconvenient, as the commutating poles require but little space and there is enough room available round them inside the frame of the dynamo machine and on the other hand, the arrangement considered reduces to a minimum the number of contact-pieces or movable members liable to wear and it leads to a great simplicity in execution and to a high solidity and consequently to complete reliability in operation.

Obviously, without widening the scope of the present invention as defined in accompanying claims, various modifications may be brought to the embodiments disclosed and in particular, the different features of said different embodiments may be associated in any desired manner.

Thus, it is possible to provide as well a direct or indirect mechanical control for the contact blades operating the reversal of the commutating pole controlling switches or else an indirect or direct mechanical or electrical control for the short-circuiting switches in the double winding commutating poles.

What I claim is:

1. In a reversible direct current generator of the type including a rotatable ring for supporting the brush-holders and adapted to be shifted to one polar pitch by the rotation of the generator between two stops which limit the movement of said ring in each direction, in combination, commutating poles the windings of which are de-energized at rest, and means for energizing said windings at the starting of the generator in opposite directions according to the rotary direction of said generator, each of said directions being determined by the direction of the movement of the ring for reaching each of the two stops.

2. In a reversible direct current generator of the type including a rotatable ring for supporting the brush-holders and adapted to be shifted to one polar pitch by the rotation of the generator between two stops which limit the movement of said ring in each direction, in combination, commutating poles the windings of which are de-energized at rest, circuit elements connected with said windings and adapted to be closed selectively for the energization of said windings in opposite directions, and means for selecting said circuit elements according to the stop reached by the rotatable ring.

3. In a reversible direct current generator of the type including a rotatable ring for supporting the brush-holders and adapted to be shifted to one polar pitch by the rotation of the generator between two stops which limit the movement of said ring in each direction, in combination, commutating poles with windings, three circuit elements adapted to be closed selectively for the energization of said windings in opposite directions and for short-circuiting same and connected in parallel with the main circuit fed by the generator to the same side of the brushes, a switch in register with each stop, and means for actuating each switch through the engagement of the rotatable ring with the corresponding stop to close the circuit element feeding the commutating pole windings in the corresponding direction and to open the short-circuiting element.

4. In a reversible direct current generator of the type including a rotatable ring for supporting the brush-holders and adapted to be shifted to one polar pitch by the rotation of the generator between two stops which limit the movement of said ring in each direction, in combination, commutating poles with windings, three circuit elements adapted to be closed selectively for the energization of said windings in opposite directions and for short-circuiting same and connected in parallel with the main circuit fed by the generator to the same side of the brushes, an electromagnetic winding secured to the rotatable ring and connected with said main circuit, a switch registering with each stop and adapted to be controlled by said electromagnetic winding upon abutment of the rotatable ring against the corresponding stop to close the circuit element energizing the commutating pole windings in the corresponding direction and to open the short-circuiting element.

5. In a reversible direct current generator of the type including a rotatable ring for supporting the brush-holders and adapted to be shifted to one polar pitch by the rotation of the generator between two stops which limit the movement of said ring in each direction, in combination, commutating poles with windings, three circuit elements adapted to be closed selectively for the energization of said windings in opposite directions and for short-circuiting same and connected in parallel with the main circuit fed by the generator to the same side of the brushes, a switch in register with each stop, means for actuating each switch through the engagement of the rotatable ring with the corresponding stop, each switch including three elementary switches the two first of which are adapted to close the corresponding commutating pole energizing circuit element upon engagement of the said ring with the corresponding stop, the third elementary switch closing the short-circuiting element when the switch is at rest.

6. In a reversible direct current generator of the type including a rotatable ring for supporting the brush-holders and adapted to be shifted to one polar pitch by the rotation of the generator between two stops which limit the movement of said ring in each direction, in combination, commutating poles with windings, two circuit elements in shunt relationship with the main circuit fed by the generator and feeding the commutating pole windings in opposite directions, a short-circuiting circuit element in parallel with said circuit elements, a switch in register with each stop, means for actuating each switch through the engagement of the rotatable ring with the corresponding stop, each switch including two elementary switches inserted in the corresponding shunt circuit to either side of the commutating pole windings to energize the latter when operative and a third elementary switch closing the short-circuiting element when at rest and opening same just after the shunt circuits are closed.

7. In a reversible direct current generator of the type including a rotatable ring for supporting the brush-holders and adapted to be shifted to one polar pitch by the rotation of the generator between two stops which limit the movement of said ring in each direction, in combination, commutating poles with windings, three circuit elements adapted to be closed selectively for the energization of said windings in opposite directions and for short-circuiting same and connected in parallel with the main circuit fed by the generator to the same side of the brushes, pusher members adapted to form slightly receding stops for the rotatable ring for each direction of rotation of the generator, and two switches respectively controlled by said pusher members upon engagement of the latter by the rotatable ring, each of said switches being adapted to close the circuit element feeding the commutating pole windings in the corresponding direction and to open the short-circuiting element.

8. In a reversible direct current generator of the type including a rotatable ring for supporting the brush-holders and adapted to be shifted to one polar pitch by the rotation of the generator between two stops which limit the movement of said ring in each direction, in combination, commutating poles with windings, three circuit elements adapted to be closed selectively for the energization of said windings in opposite directions and for short-circuiting same and connected in parallel with the main circuit fed by the generator to the same side of the brushes, a switch in register with each stop, means for actuating each switch through the engagement of the rotatable ring with the corresponding stop, each switch including three elementary switches the two first of which are adapted to close the corresponding commutating pole energizing circuit element upon engagement of the rotatable ring with the corresponding stop, the third elementary switch closing the short-circuiting element when the switch is at rest and opening only shortly after closing of either of the shunt circuits feeding the commutating pole windings.

9. In a reversible direct current generator of the type including a rotatable ring for supporting the brush-holders and adapted to be shifted to one polar pitch by the rotation of the generator between two stops which limit the movement of said ring in each direction, in combination, commutating poles with windings, three circuit elements adapted to be closed selectively for the energization of said windings in opposite directions and for short-circuiting same and connected in parallel with the main circuit fed by the generator to the same side of the brushes, a pusher member adapted to form a slightly receding stop for the rotatable ring for each direction of rotation of the generator, a holding winding carried by the rotatable ring adapted to be energized by said main circuit, a magnetic armature associated with each pusher member adapted to be attracted by the holding winding upon abutment of the rotatable ring against the corresponding pusher member, and two switches respectively controlled by said pusher members upon engagement of the latter by the rotatable ring, each of said switches being adapted to close the circuit element feeding the commutating pole windings in the corresponding direction and to open the short-circuiting element.

10. In a reversible direct current generator of the type including a rotatable ring for supporting the brush-holders and adapted to be shifted to one polar pitch by the rotation of the generator between two stops which limit the movement of said ring in each direction, in combination, commutating poles with windings, three circuit elements adapted to be closed selectively for the energization of said windings in opposite directions and for short-circuiting same and connected in parallel with the main circuit fed by the generator to the same side of the brushes, a switch in register with each stop, means for actuating said switch through the engagement of the rotatable ring with the corresponding stop, two auxiliary relays controlled by said switches, and, for each auxiliary relay, three elementary switches actuated by the corresponding relay the two first of which are adapted to close the corresponding commutating pole energizing circuit element upon engagement of the said ring with the corresponding stop, the third elementary switch closing the short-circuiting element when the switch is at rest.

11. In a reversible direct current generator of the type including a rotatable ring for supporting the brush-holders and adapted to be shifted to one polar pitch by the rotation of the generator between two stops which limit the movement of said ring in each direction, in combination, commutating poles having windings including two elements in series adapted to provide opposite magnetizations, the main circuit fed by the generator through the brushes passing through the commutating pole windings, a short circuit for each element of the commutating pole windings, a switch in each short-circuit in register with each stop, means for controlling each switch through the engagement of the rotatable ring with the corresponding stop to open said switch in the corresponding short-circuit, said switches being normally closed when the generator is at rest.

ANDRÉ LOUIS VINTENON.

References Cited in the file of this patent

UNITED STATES PATENTS

| Number | Name | Date |
| --- | --- | --- |
| 544,361 | Loveridge | Aug. 13, 1895 |
| 1,251,645 | Creveling | Jan. 1, 1918 |
| 1,276,727 | Creveling | Aug. 27, 1918 |
| 2,516,220 | Kocher | July 25, 1950 |

FOREIGN PATENTS

| Number | Country | Date |
| --- | --- | --- |
| 328,528 | Germany | Oct. 27, 1920 |